United States Patent
Gowda et al.

[11] Patent Number: 5,898,168
[45] Date of Patent: Apr. 27, 1999

[54] IMAGE SENSOR PIXEL CIRCUIT

[75] Inventors: Sudhir Muniswamy Gowda, Ossining, N.Y.; Hyun Jong Shin, Ridgefield, Conn.; Hon-Sum Philip Wong, Chappaqua, N.Y.; Peter Hong Xiao, San Jose, Calif.; Jungwook Yang, West Nyack, N.Y.

[73] Assignee: International Business Machines Corporation, Armonk, N.Y.

[21] Appl. No.: 08/873,610

[22] Filed: Jun. 12, 1997

[51] Int. Cl.[6] .............................. H04N 3/14; H04N 5/335
[52] U.S. Cl. ...................... 250/208.1; 348/249; 348/311
[58] Field of Search ....................... 250/208.1; 348/249, 348/311, 322, 323

[56] References Cited

U.S. PATENT DOCUMENTS

| | | | |
|---|---|---|---|
| 4,450,484 | 5/1984 | Terakawa et al. | 348/249 |
| 5,122,850 | 6/1992 | Burkey | 348/322 |
| 5,748,232 | 5/1998 | Konuma | 348/311 |

*Primary Examiner*—Stephone Allen

[57] ABSTRACT

Disclosed is an image sensing device having a reduced number of transistors within each imager cell as compared to prior art devices. Each imager cell includes a photosensitive element providing a photocharge responsive to incoming light, and first, second and third transistors. The first transistor is coupled to an activation line, e.g., a row select line, that carries an activation signal to a first plurality of imager cells to selectively activate cells for image data readout. This transistor transfers the photocharge towards a reference circuit node within the image cell in response to the activation signal. The second transistor is operably coupled to the first transistor, and is operative to selectively set a voltage level at the reference node. The third transistor has a control terminal coupled to the reference node, and an output terminal coupled to an output data bus common to a second plurality of image cells, e.g., a column of cells. The third transistor providing an output signal on the data line related to the reference node voltage, which is indicative of an amount of light incident upon the photosensitive element.

26 Claims, 16 Drawing Sheets und 5,898,168

IMAGE SENSOR PIXEL CIRCUIT

FIELD OF THE INVENTION

This invention relates generally to image sensor circuitry, and, more specifically, to an image sensor pixel circuit with reduced electronics to realize improved resolution and simplify manufacturing.

BACKGROUND

With the advent of multimedia communications, there arises the need for low cost solid state image sensors to complement computers and communication devices to realize practical videotelephones and the like. The image input device is central to any teleconferencing and multimedia application. Recently, CMOS image sensors have been recognized as a viable candidate for the image input device. These image sensors also have other applications such as in robotics, machine vision and automotive applications. An important advantage of CMOS image sensors (or imagers) is that signal processing circuits can be readily integrated on the same chip as the imager, thus enabling the design of smart, single-chip camera systems. CMOS imagers are inherently lower cost than conventional charge coupled devices (CCDs) because they can be manufactured in conventional, widespread CMOS fabrication lines without any process modification.

FIG. 1 schematically illustrates one example of prior art active-pixel CMOS imager circuitry. Imager 10 is single-stage, charge coupled device (CCD) type of image sensor, as disclosed in an article by Mendis et al., entitled "A 128×128 CMOS Active Pixel Image Sensor for Highly Integrated Imaging Systems", IEEE Electron Devices Meeting, p. 583, 1993. A MOS photogate 6 is employed as the light sensitive element in each pixel (imager cell) 18. The transistors within each pixel 18 are typically NMOSFETS. The overall imager 10 is considered a CMOS imager since CMOS electronics are used in conjunction with the imager cells. For example, the transistors 3 within readout circuit 31 are typically PMOSFETS. As shown in the simplified block diagram of FIG. 2, imager 10 includes a plurality of cells 18 arranged in an array of rows $R_1$–$R_M$ and columns $C_1$–$C_N$. Typically, only one row at a time is activated for image charge readout from all the cells 18 in that row. Timing and control logic 14 provides row select signals (VROW) on row select lines $RSL_1$–$RSL_M$ to select the active row. RESET pulses on lines $RES_1$ to $RES_M$ are also generated by logic block 14 for application to cells 18. The light-induced charge from each activated cell is read out as a corresponding voltage on one of column buses $15_1$ to $15_N$, each of which is connected to the cells 18 in corresponding columns $C_1$ to $C_N$. The voltage on each line $15_i$ corresponds, at any given time, to the image charge of only one activated cell in the associated column $C_i$ and activated row. Readout circuits $31_1$ to $31_N$ read out the voltage of the activated cell in the corresponding column $15_1$–$15_N$. A load transistor 28 is utilized on each column bus. Capacitance Cc represents the bus line capacitance. Bus lines $19_1$ to $19_N$ carry voltages VDD, VPG and VTX to the respective cells 18. Processing/image storage electronics 16 receives the voltages from the readout circuits for storage in memory and subsequent processing and display. Logic blocks 14 and 16 are clock synchronized.

As shown in FIG. 1, within each cell 18, a small surface channel CCD is fabricated. Photo-charge "q" collected under photogate transistor 6 is transferred through a dc-biased transfer gate transistor 8 to a floating diffusion diode 7 formed beneath substrate surface 9. This floating diode 7 is periodically dc-restored by the application of a logic high RESET pulse to the gate of reset FET 11, thus resetting the potential of diode 7 (i.e., at circuit node 17) to a voltage determined by the threshold voltage of FET 11 and the power supply voltage (VDD). Following each diode reset cycle, the photo-charge is transferred to floating diode 7. The voltage on diode 7 then corresponds to the intensity of light incident upon imager cell 18. This voltage sets the potential of the gate of source follower FET 13, which amplifies or buffers the voltage appearing at its gate terminal for subsequent readout. When row select transistor 12 is turned ON by a VROW pulse on row select line RSL, the voltage at circuit node 17 is detected by readout circuit 31 detecting corresponding voltage on column bus 15.

The reset noise is removed by a variation of the correlated double sampling technique as disclosed in an article by White et al., entitled "Characterization of Surface Channel CCD Image Arrays at Low Light Levels", IEEE Journal of Solid State Circuits, vol. SC-9, p.1, 1974. To remove reset noise (kT/C noise) the signal level measured on column bus 15 is subtracted from the reset level on the column bus obtained just prior to the transfer of photo-charge to diode 7. In the embodiment of Mendis et al., the reset level and the signal level are stored on two separate sample and hold capacitors CR and CS, via two separate switches S1 and S2, respectively. Two identical readout circuit portions are required, one for the reset level, and one for the signal level. Further differential amplification at the multiplexed column output (within circuit block 16) is required to complete the reset noise removal operation.

One shortcoming of the Mendis-type cell 18 of FIG. 1 is that the row select transistor 12 is a relatively large MOSFET which occupies substantial space within the cell. Ideally, it is desirable to maximize the area within each pixel allocated to the light sensitive element (phototransistor or photodiode) to increase the resolution of the imager. Hence, the space occupied by FET 12 results in less surface area for photogate 6, thereby diminishing imager resolution and precluding any reduction in pixel size to improve resolution further. In general, it would be desirable to employ as little electronics as possible within each imager cell to maximize available space for the light sensitive element and also, to simplify the image sensor manufacturing process. The present disclosure is a step in this direction.

SUMMARY OF THE INVENTION

The present invention relates to an image sensing device having a reduced number of transistors within each imager cell as compared to prior art devices.

In an exemplary embodiment, the image sensing device has a plurality of imager cells, where each imager cell includes a photosensitive element providing a photocharge responsive to incoming light, and first, second and third transistors to provide an output indicative of the light intensity. The first transistor is coupled to an activation line, e.g., a row select line, that carries an activation signal to a first plurality of imager cells to selectively activate cells for image data readout. This transistor transfers the photocharge towards a reference circuit node within the image cell in response to the activation signal. The second transistor is operably coupled to the first transistor, and is operative to selectively set a voltage level at the reference node. The third transistor has a control terminal coupled to the reference node, and an output terminal coupled to an output data bus common to a second plurality of image cells, e.g., a column of cells. The third transistor provides an output signal on the data line related to the reference node voltage, which is indicative of an amount of light incident upon the photosensitive element.

Advantageously, the exemplary embodiment of the present invention eliminates the above-discussed row select transistor of the prior art by utilizing the first and second transistors to perform the pixel (imager cell) selection function. This is accomplished by supplying appropriately timed voltage waveforms to the transistor terminals. As a result, a larger area can be provided for the photosensitive element and/or pixel size can be reduced to improve resolution.

The photosensitive element may be either a photodiode or a photogate. Optionally, the image sensor may include a fourth transistor within each cell to perform an anti-blooming function. A shutter transistor may also be included to perform an electronic shutter function.

The data output by the third transistor may be either a voltage supplied to a readout circuit or a current supplied to a current mirror.

With proper application of voltage waveforms to the first, second and third transistors of each pixel cell, a correlation double sampling technique can be performed to reduce noise and improve image data quality.

BRIEF DESCRIPTION OF THE DRAWINGS

Preferred embodiments of the present invention are described herein with reference to the drawings, in which like reference numerals identify similar or identical components throughout the several figures, wherein.

DETAILED DESCRIPTION OF THE PREFERRED EMBODIMENTS

Figure 2:
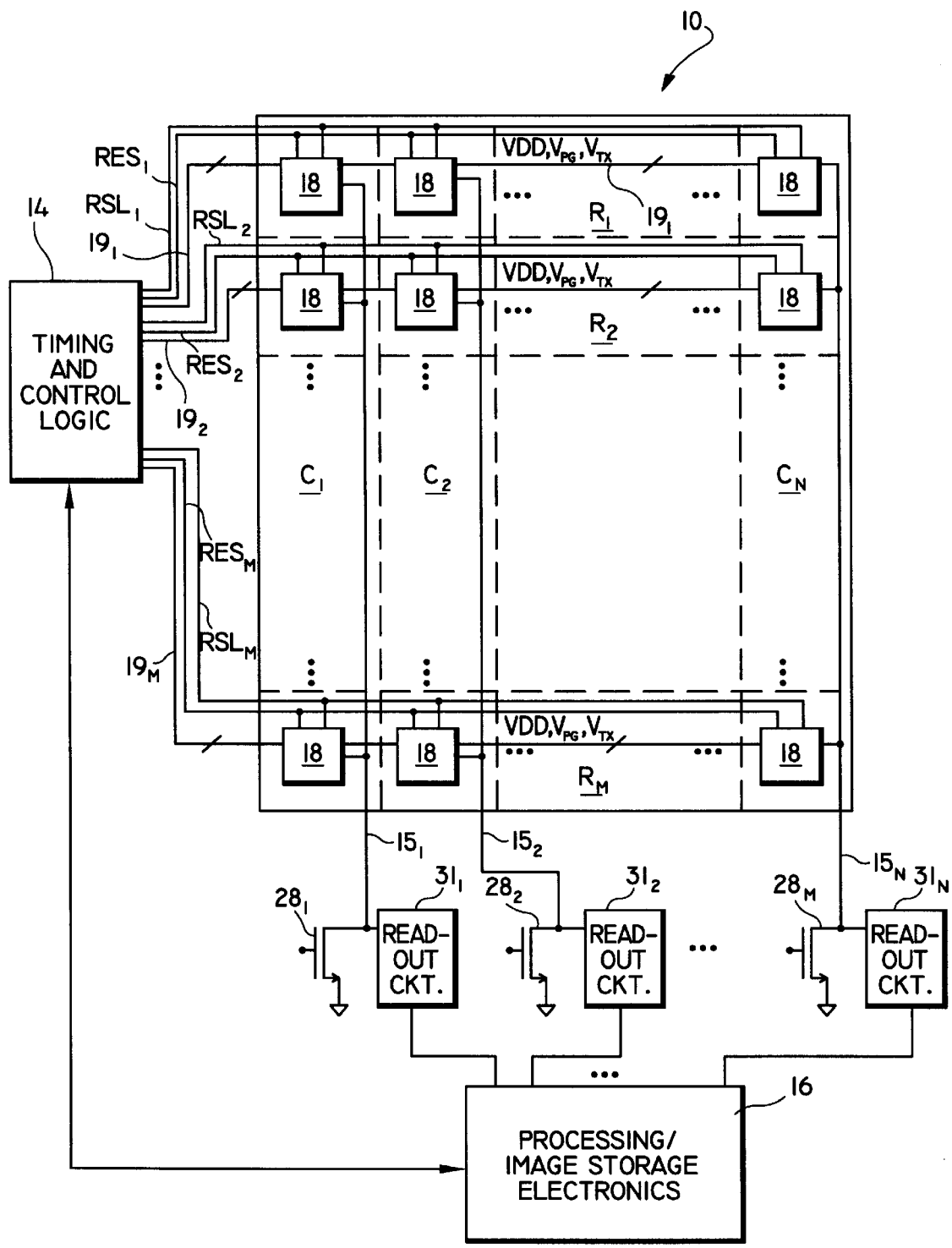
FIG. 2 is a schematic block diagram of an image sensor array.
Figure 3A:
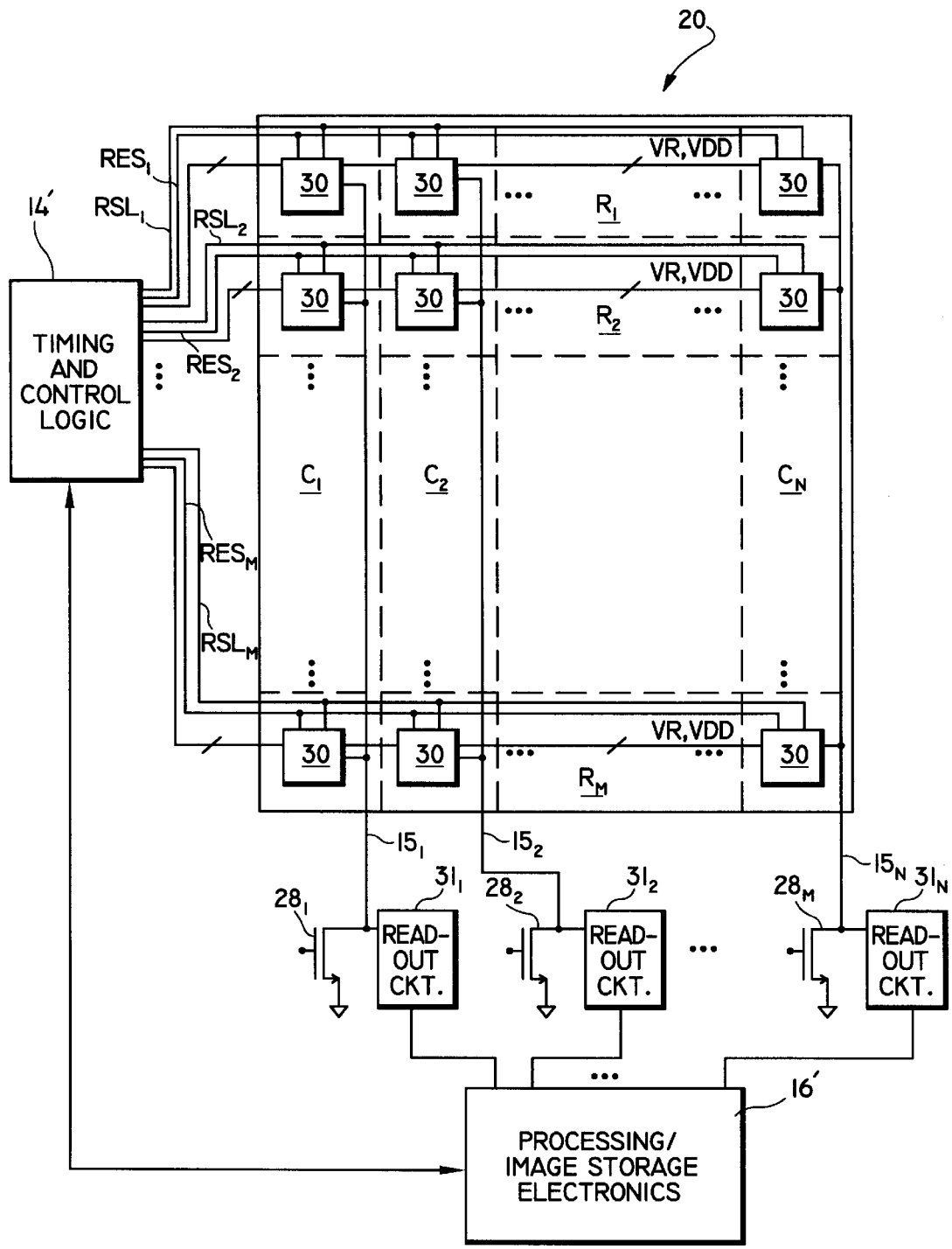
FIGS. 3A and 3B schematically illustrate a first embodiment of an image sensor of the present invention, employing a photodiode as the light sensitive element.

FIG. 3A schematically illustrates a first embodiment of an image sensing device in accordance with the present invention, designated as 20. Imager 20 includes a plurality of imager cells 30 (also referred to herein as pixels 30) arranged in M rows $R_1$–$R_M$ by N columns $C_1$–$C_N$, analogous to the configuration of the imager of FIG. 2, but with cells 18 replaced by cells 30, and with fewer signal lines running to the cells. In addition, timing and control logic 14' is modified from the prior art to provide different timing waveforms to cells 30 as will be described hereafter.

Figure 1:
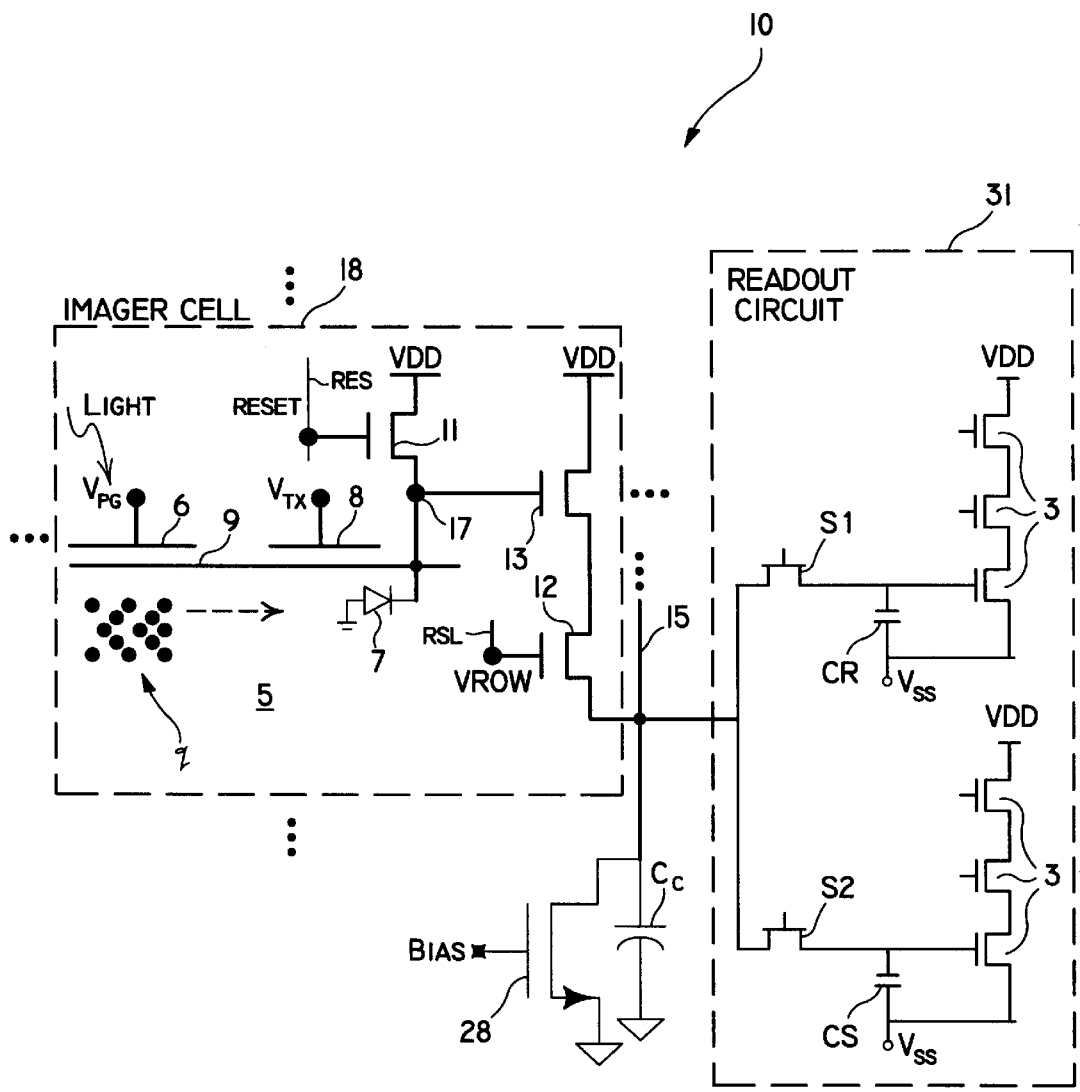
FIG. 1 schematically illustrates a prior art pixel circuit.
Figure 3B:
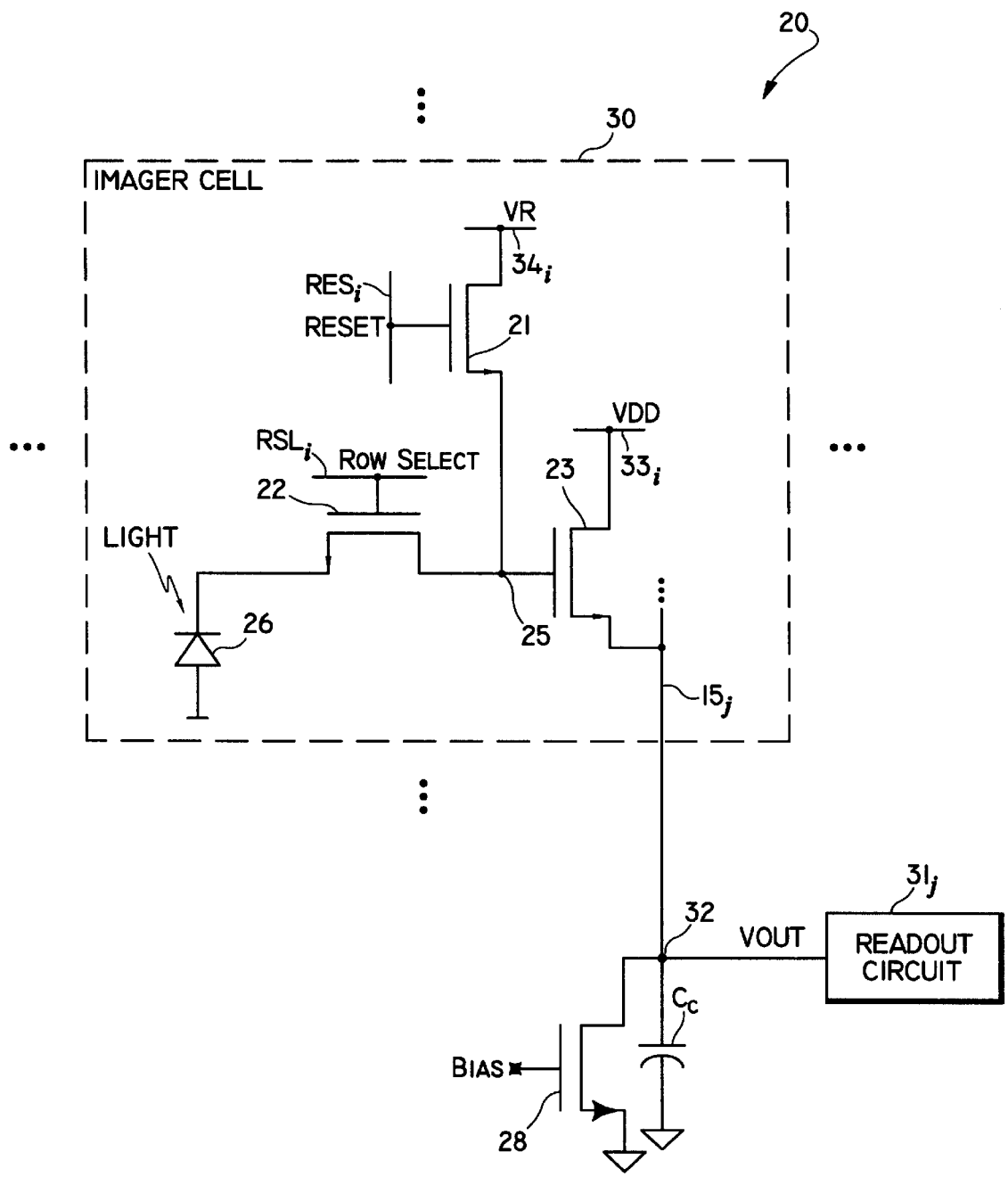

Referring to FIG. 3B, the basic cell 30 of imager 20 differs from cell 18 in that the large row select MOSFET 12 is eliminated, such that the column bus, e.g., $15_j$ in the "jth" column, connects directly to a source follower transistor 23. Also, in this embodiment, a photodiode 26 is used as the photosensitive element. Each column bus as $15_j$ provides signal output to a readout circuit $31_j$ similar or identical to that discussed above. Advantageously, imager 20 exhibits improved resolution over the prior art of FIG. 1 by utilizing the extra space created by eliminating transistor 12 to provide a larger area for the photosensitive element and/or reduce the overall pixel size.

The pixel circuit of cell 30 eliminates the separate row selection transistor by employing FET 22 to perform both a charge transfer function and a pixel selection function. The row select line $RSL_i$ of any row $R_i$ connects directly to the gate of FET 22. In addition, the pixel selection function is carried out in conjunction with reset transistor 21. As such, reset transistor 21 is functionally different from reset transistor 11 of FIG. 1, which, in the prior art, was used strictly for resetting the reference circuit node 17 (readout node). In the prior art, the bus line RES connecting the gate of FET 11 to timing and control logic 14 is typically tied to multiple rows, whereby the cells of multiple rows are reset together. In the embodiments disclosed herein, each reset bus $RES_i$ is dedicated for a single row and is not tied to multiple rows, thereby enabling the reset device 21 to perform a partial pixel selection function as well as a reset function.

FET 21 operates to reset the reference circuit node 25 to nearly the voltage level VR on bus line $34_i$ when the RESET signal on the RES bus is pulsed. Specifically, the node 25 voltage is reset to VR-$V_{DS21}$, where $V_{DS21}$ is about the same as the threshold voltage $V_{TH}$ of FET 21, typically about 0.4–0.5 volts. As will be explained more fully below, following the application of the RESET pulse, the voltage at reference node 25 is indicative of the reset level (including reset noise) during a first sampling time interval in which charge transfer device 22 is OFF. During a second sampling interval in which device 22 is ON, the reference node 25 voltage is indicative of photocharge collected by photodiode 26, and hence, the intensity of light incident upon cell 30. Source follower FET 23 is used to buffer the voltage at reference node 25 and transfer an output voltage related to the photocharge to column data line $15_j$. At any given time, only one pixel 30 per column is active, as controlled by both the ROW SELECT signal and the RESET signal. As such, the voltage VOUT on output node 32 of each column bus is directly related to the voltage on reference node 25 of the active pixel. The gate of FET 22 is tied to the $RSL_i$ bus to receive the ROW SELECT signal. In the prior art, the RSL line is tied to the separate MOSFET 12. With the present invention, the relatively small charge transfer FET 22 performs a partial pixel selection function formerly performed by the large MOSFET 12.

Figure 4:
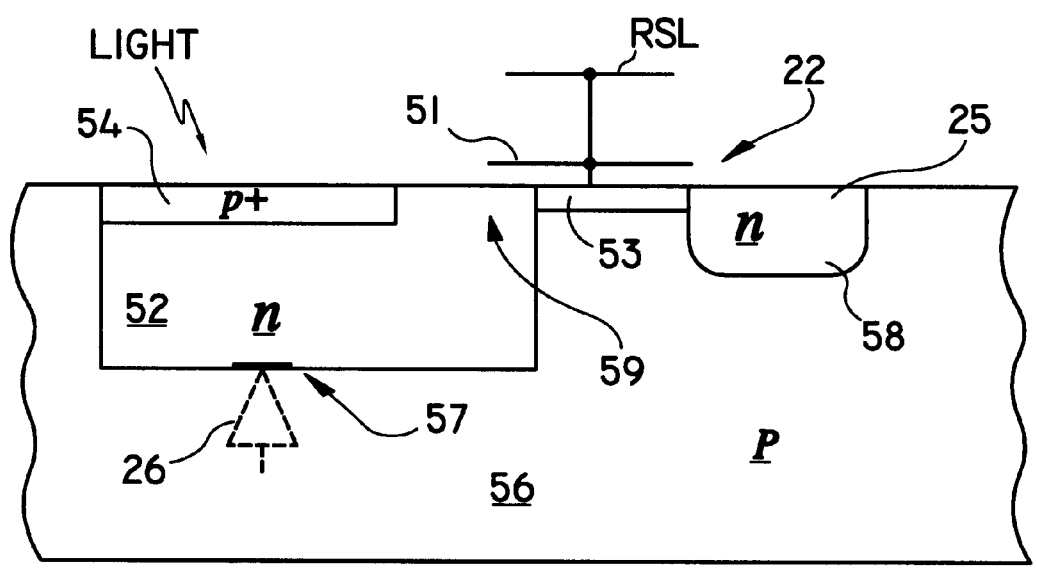
FIG. 4 is a cross section of a portion of the image sensor of FIG. 3B.

FIG. 4 shows a cross section of the physical structure of photodiode 26 adjacent FET 22. Photodiode 26 and FET 22 are formed in a common p type substrate 56. (FETS 21 and 23 are also formed in substrate 56). Each of FETS 21, 22 and 23 are NMOSFETS in the shown embodiment; however, PMOSFETS may alternatively be utilized. An n type region 52 is shared between photodiode 26 and FET 22. The top region 59 within region 52 forms the source (or alternatively, the drain) of FET 22. The diode 26 is formed by means of the p-n junction 57 between region 52 and substrate 56. FET 22 has n type channel 53 and drain regions 58 and gate metallization 51 connected to row select line RSL. Photodiode 26 may be either a simple p-n diode or a pinned diode such as described in an article by B. Burkey et al., entitled "The Pinned Photodiode for an Interline-Transfer CCD Image Sensor," International Electron Devices Meeting, p. 28, 1984. In the pinned diode case, a thin p+ layer 54 is formed on the substrate surface atop n well 52.

Figure 5:
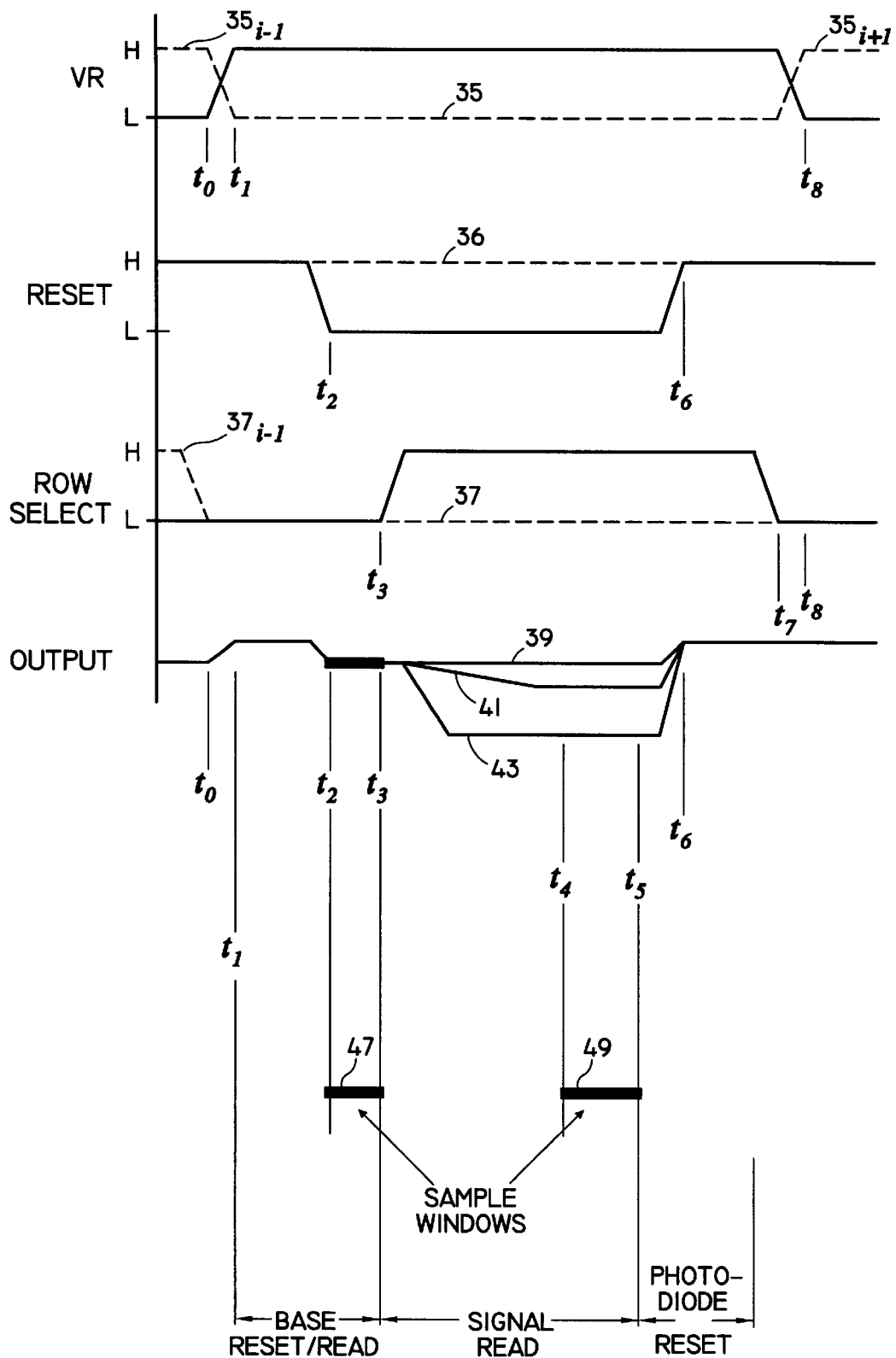
FIGS. 5 and 6 are timing diagrams of waveforms applied to image sensor cells of FIGS. 3, 7 and 8.

Operation of the pixel circuit of FIGS. 3–4 will now be described in conjunction with the timing diagram of FIG. 5. The solid lines of the VR, RESET and ROW SELECT waveforms in the diagram represent the waveforms applied to the active pixel 30 in the "ith" row and "jth" column. The dotted lines 35–37 represent the respective waveforms applied to inactive pixels 30 in that column (i.e., inactive during the time interval from time $t_0$ to $t_8$). The ensuing discussion pertains to the active pixel. The time prior to time $t_0$ represents a photocharge collection period. In this period, VR is low, RESET is high, and ROW SELECT is low. "High" potential for the various waveforms discussed herein is typically 1.2, 1.8, 2.5, 3.3 or 5 volts; "low" is typically zero volts. Photocharge is collected in the photodiode during the photocharge collection period and the potential of photodiode 26 (i.e., the potential of n region 52 relative to substrate 56) is lowered corresponding to the amount of photocharge collected. Since ROW SELECT is low, FET 22 is OFF and the photocharge does not get transferred out during this time. Also, RESET is high, turning FET 21 ON, whereby reference node 25 is set at a voltage close to VR, which is low. As such, the gate of readout FET 23 is low, turning FET 23 OFF, whereby no output voltage from that pixel is applied to readout circuit $31_j$. Meanwhile, VR is high for one other pixel 30 in the column at any given time during the photocharge collection period to permit sequential data readout from those pixels. For example, waveform portion $35_{i-1}$ represents VR applied to ROW $R_{i-1}$.

At time $t_0$, VR begins rising, reaching a high level at time $t_1$, whereupon a base reset/read period commences to set a base voltage level at reference node 25 and read out the same. When VR is high, reference node 25 is set to a high potential since FET 21 is still ON. The RESET signal is then brought to low at time $t_2$, isolating reference node 25 from the VR bus 34. Due to parasitic gate to source capacitance of the reset FET 21, noise on the RES (clock) line feeds through to reference node 25. As such, this "clock feedthrough" due to RESET going low is also stored in circuit node 25. After RESET goes low at time $t_2$, the potential of node 25 remains close to its previous value when RESET was high due to the capacitance between reference node 25 and the substrate. The node 25 potential is then sampled at the column bus output node 32 through source follower FET 23. The output voltage VOUT at node 32 is proportional to the reference node 25 voltage change due to the transferred photocharge since FET 23 linearly amplifies the change in node 25 voltage due to the source follower configuration. PET 23 has its drain tied to a supply voltage VDD on bus $33_j$, e.g., in the range of 1.2–5V. VDD can be either the same voltage level or a different voltage level than the high potential of VR. Transistor 28 acts as a constant load resistor. Hence, during sampling window 47, VOUT is the reset value for the subsequent correlated double sampling operation as described in the M. White et al. article cited above.

After the reset value is read in sampling period 47, ROW SELECT is brought high at time $t_3$, tuning on FET 22 and thereby allowing the charge collected in photodiode 26 to be shared among the photodiode capacitance and the capacitance at reference node 25. The potential of reference node 25 will fall corresponding to the amount of electrons collected in photodiode 26. VOUT will fall corresponding to the reference node 25 potential. Signal readout at the column bus (readout of VOUT) is done at sampling window 49 between times $t_4$ and $t_5$. For example, voltage level 43 would be measured when light is high, level 39 would be measured when light intensity is low (dark condition) and level 41 is measured for a medium light intensity. The reset value obtained from the reset read period in sample window 47 can be then subtracted from the signal value obtained during sample window 49 to complete the correlated double sampling operation described by M. H. White et al.

After signal read, photodiode 26 needs to be reset to a high potential before the next cycle of photocharge collection can begin. This is accomplished by raising the RESET signal at time $t_6$ high, while keeping the ROW SELECT and VR bus signals high. As such, reference node 25 will be high, and the photodiode is reset to a high potential since FET 22 is ON. Following this operation, ROW SELECT is brought low again at time $t_7$ to turn FET 22 OFF and isolate reference node 25 from photodiode 26, which begins another cycle of photocharge collection. RESET remains high and VR goes low at time $t_8$, thus inactivating readout FET 23 and allowing the readout FET of other pixel rows to put signals on column bus $15_j$ (as indicated by trace $35_{i+1}$).

As mentioned above, in the present invention, the reset switch 21 performs both a reset function and a pixel selection function. During the time interval between $t_2$ to $t_5$, which encompasses the sample windows 47 and 49, the RESET signal applied to all the other reset switches 21 of the inactive pixels 30 in the column, i.e., the RESET signal applied to all the other rows, is high (see trace 36). Also, VR applied to all the inactive pixels is low during this time interval (see trace 35). Consequently, the reset switches of all the inactive pixels are ON, setting the reference nodes 25 of all the inactive pixels to the low VR potential. The source follower FET 23 of all the inactive pixels are thus OFF, whereby column bus $15_j$ is isolated from the reference node 25 voltages of the inactive pixels. As such, the output voltage VOUT of column bus $15_j$ corresponds only to the reference node 25 voltage of the active pixel 30 in the column.

Figure 6:
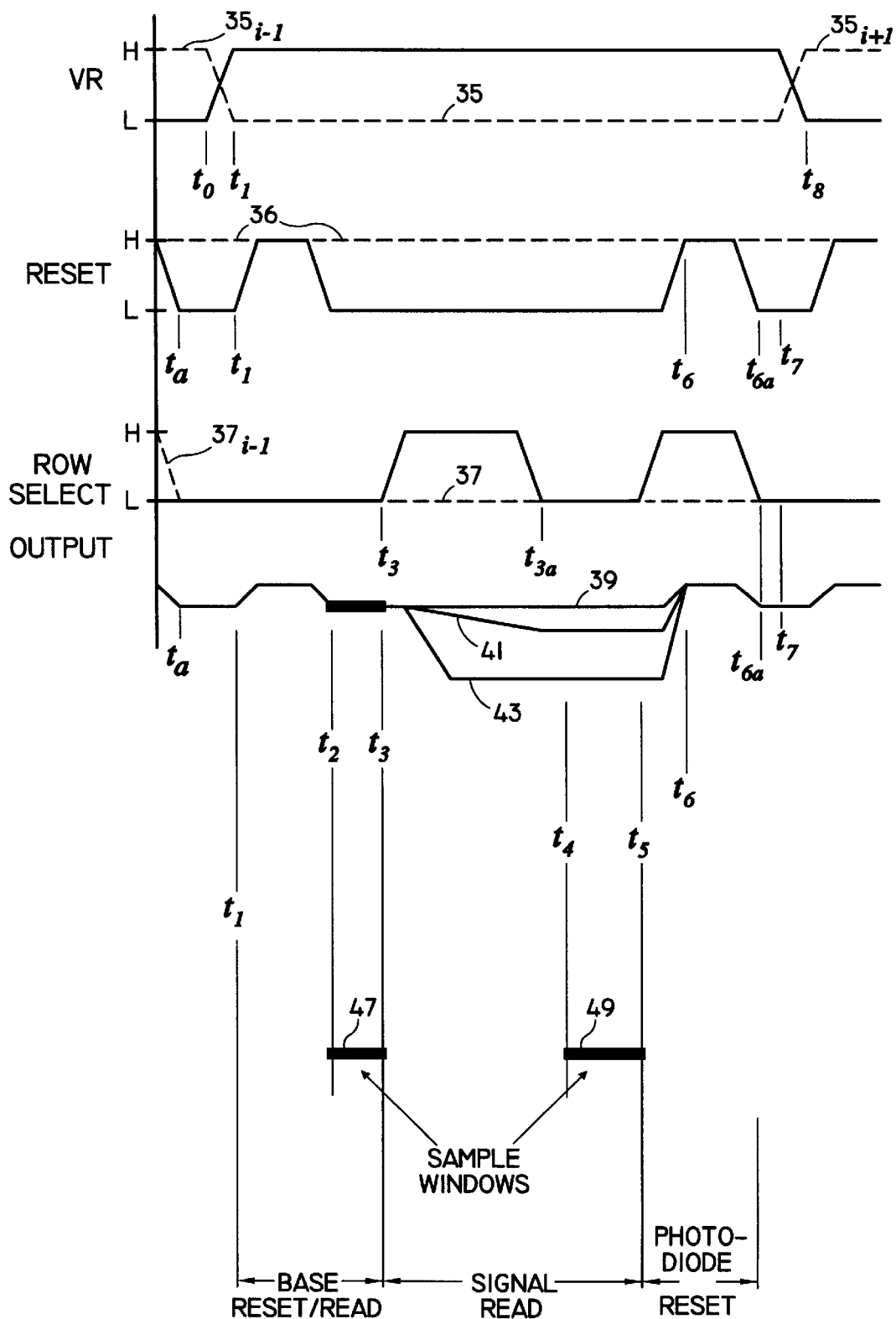

FIG. 6 illustrates a timing diagram of alternative waveforms for the RESET and ROW SELECT signals. The pixel circuit 30 of FIG. 3 can operate with either one or both of these waveforms applied as alternatives to those presented in FIG. 5. Referring first to the alternate RESET waveform, prior to onset of the reset period at time $t_0$, RESET is brought low at time $t_a$, before raising VR. This approach reduces feedthrough from the RES line to the reference node 25 due to the gate to source capacitance of the RESET FET 21. In addition, after the photodiode reset period, the RESET signal is brought low at time $t_{6a}$ before VR goes low at time $t_8$. After VR goes low, the RESET signal has to be brought high again to hold reference node 26 to the low potential at VR so as to isolate the readout FET 23 from column bus 15 and allowing the readout FETs of other pixel rows to put signals on the column bus.

Referring now to the alternate ROW SELECT waveform of FIG. 6, after ROW SELECT is brought high at time $t_3$ to read out the signal charge, ROW SELECT is brought low at time $t_{3a}$ before the signal sampling window 49. ROW SELECT then remains low during sampling window 49. This technique allows the clock coupling due to the row select FET 22 to be canceled before signal read. Such clock coupling would otherwise be present due to the parasitic gate to source capacitance of FET 22. The ROW SELECT signal is then brought high again during the photodiode reset period to allow the photodiode to be reset through FET 22 and FET 21.

As mentioned above, photodiode 26 can be a pinned photodiode instead of a simple pn junction diode. For a simple pn junction diode, the photocharge collected is shared between the photodiode capacitance and the reference node 25 capacitance during the charge transfer operation. In the alternate embodiment with a pinned photodiode, the photocharge collected in the pinned photodiode can be completely transferred to the reference node without charge sharing. The pinned photodiode potential is lower than the reference node potential. In the pinned photodiode case, the photodiode reset period is not necessary because the signal read results in complete charge transfer and the photodiode is reset as it is read.

Figure 7:
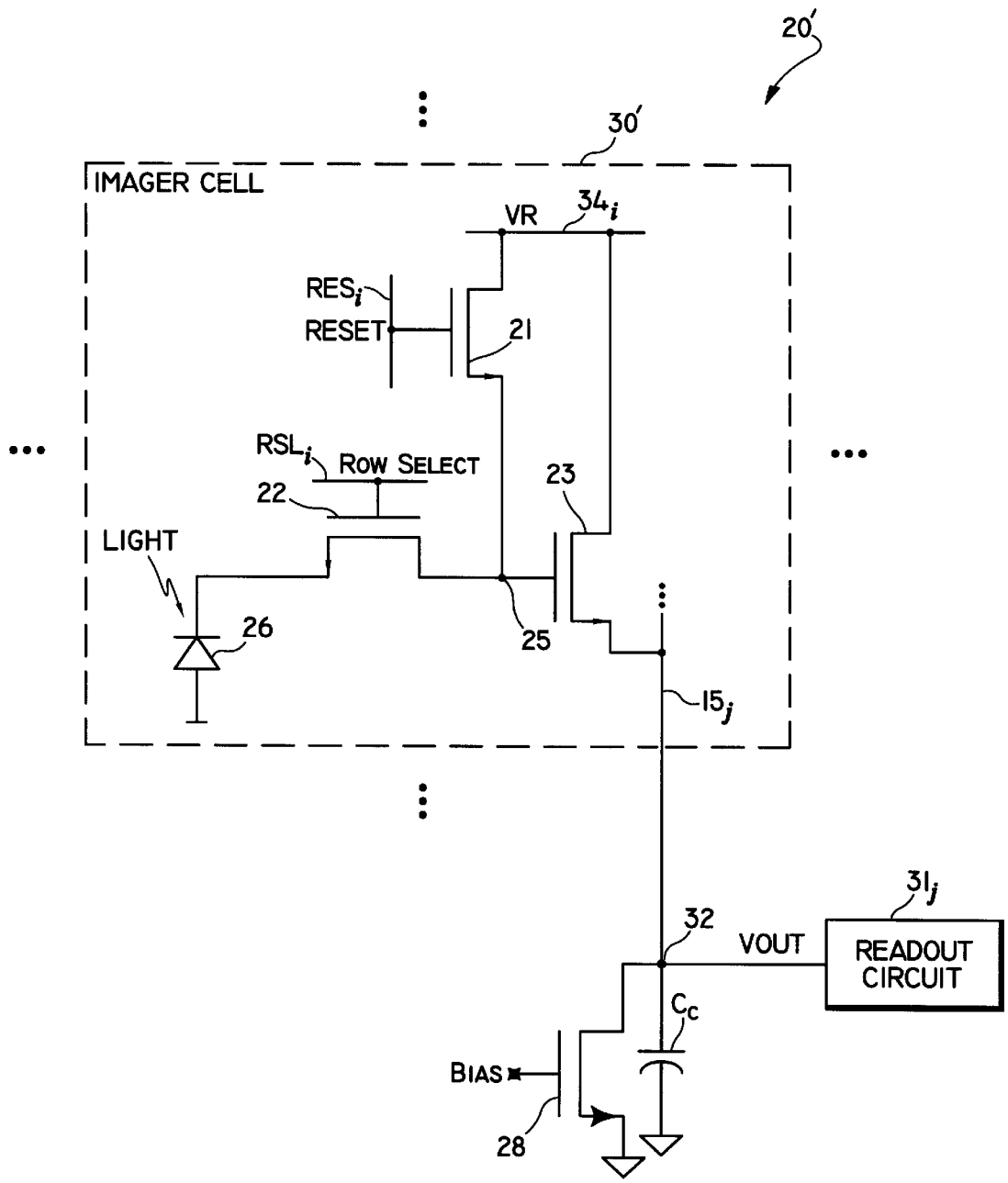
FIGS. 7 and 8 illustrate alternate embodiments of image sensors.

FIG. 7 shows an alternate embodiment of an image sensor of the present invention, designated as 20'. Image sensor 20' differs from image sensor 20 of FIG. 3 discussed above by utilizing a common reset bus $34_i$ to bias both the reset transistor 21 and the source follower 23 within each imager cell (pixel) 30' of any given row $R_i$. (In the image sensor of FIG. 3, the reset bus $34_i$ is separate from the VDD bus $33_i$).

The operation of pixel circuit 30' is the same as the photodiode pixel circuit 30 with a separate reset bus described above. The timing diagrams of FIGS. 5 and 6 are applicable to the pixel circuit 30' as well. By connecting the source follower power supply to the VR bus, one signal line is eliminated from the pixel circuit, resulting in an even smaller area occupied by the pixel circuits, and hence enlarging the photosensitive area.

Figure 8:
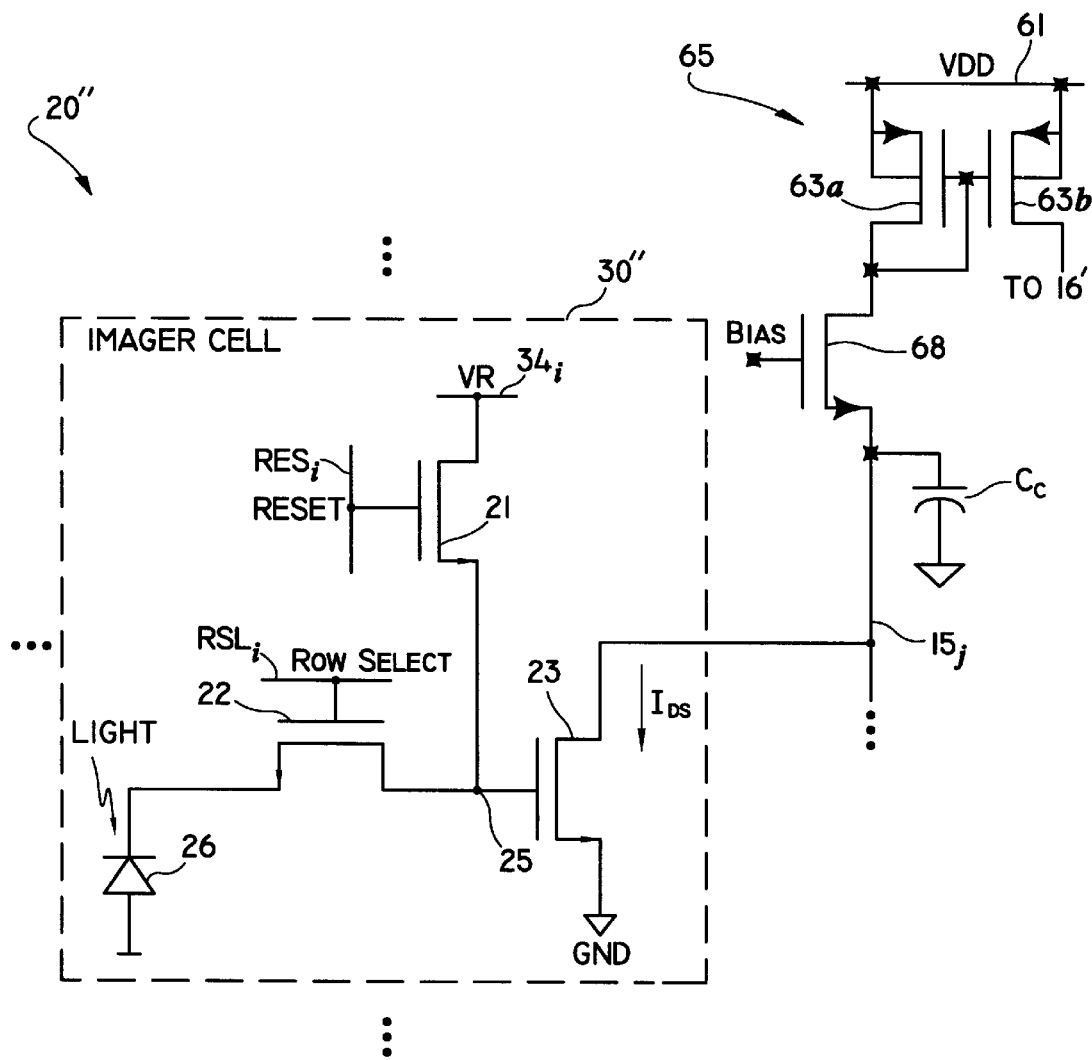
Figure 9:
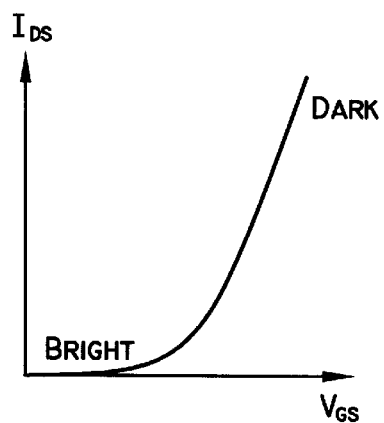
FIG. 9 is a graph of current vs. voltage within the imager cell of FIG. 8.

Referring now to FIG. 8, another embodiment 20" of an image sensor employs a photodiode pixel circuit 30" with a separate reset bus and a current mode output. Pixel circuit 30" is essentially the same as pixel circuit 30 of FIG. 3, with the exception of the source of FET 23 being connected to ground potential and the drain of FET 23 being connected to column bus $15_j$. The operation of pixel circuit 30" and timing waveforms are the same as for pixel circuit 30 with separate reset bus of FIG. 3 described above. As such, the timing diagrams of FIGS. 5 and 6 are applicable to image sensor 20", except that the OUTPUT waveform is representative of current rather than a voltage. (The OUTPUT current waveform will nevertheless look the same as the waveform for VOUT, proportionally scaled). Instead of using a voltage readout circuit 31 to read VOUT, the reference node 25 potential is used to bias FET 23 to obtain a current on column bus $15_j$. The reference node 25 potential determines the $V_{GS}$ of FET 23. The $I_{DS}$ VS. $V_{GS}$ relationship of FET 23 is depicted in FIG. 9. The transfer function of light to current ($I_{DS}$) is non-linear. A bias transistor 68 sets the bias current of the column bus $15_j$. The current at column bus $15_j$ is read out by a current mirror 65 comprising a pair of FETs 63a, 63b connected to form a current mirror in a conventional fashion. The source of FET 63b is connected to image storage electronics 16' similar to that mentioned above in connection with FIG. 2. It is noted that the technique of measuring current on an image sensor column bus is also described in an article by C. Aw et al., entitled "A 128×128 pixel standard CMOS Image Sensor with Electronic Shutter", International Solid State Circuits Conference, p. 180, 1996.

Figure 10:
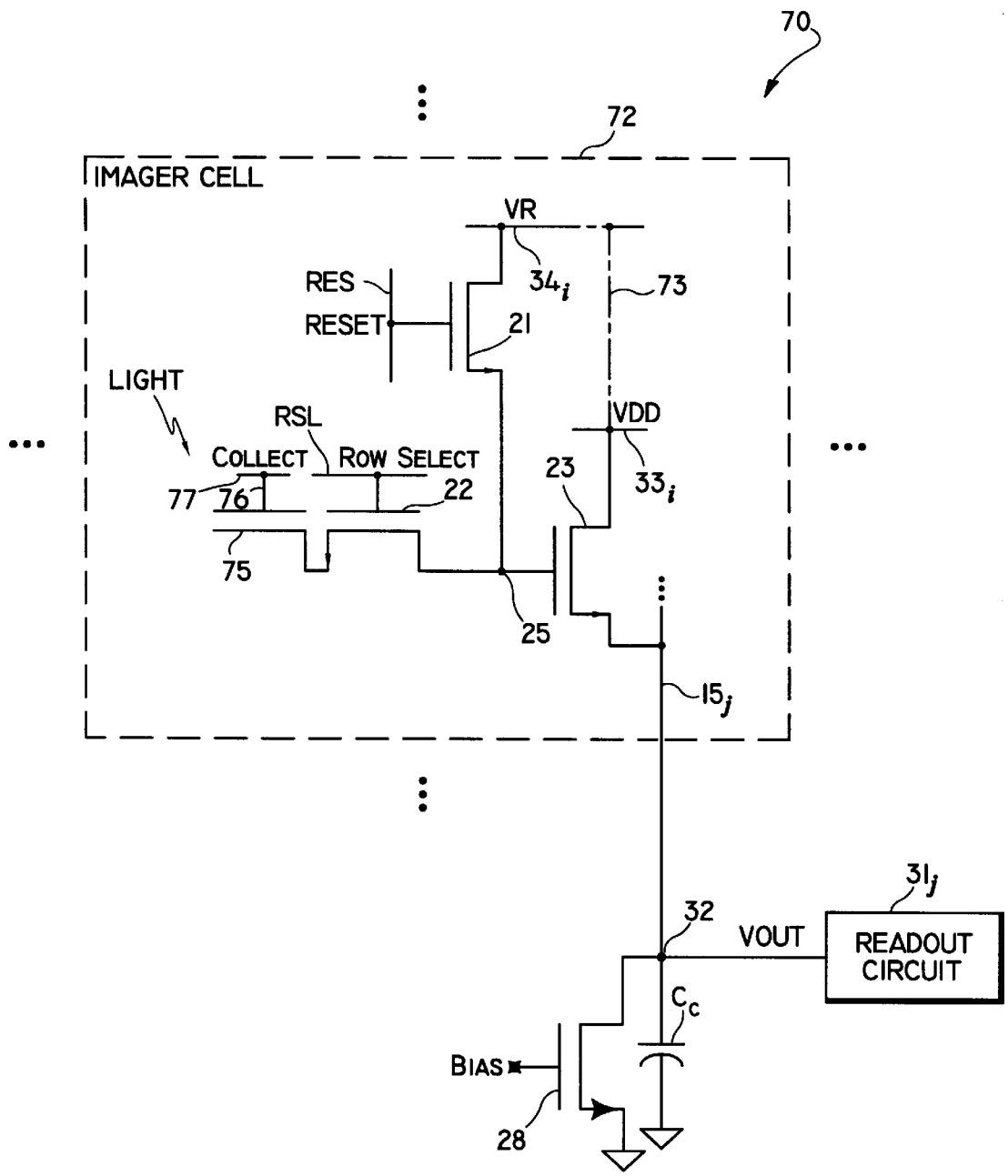
FIG. 10 illustrates another embodiment of the present invention employing a photogate as the light sensitive element.

With reference now to FIG. 10, yet another image sensor 70 in accordance with the present invention utilizes a photogate 75 as the light sensitive element within each imager cell 72, rather than a photodiode. Device 75 is preferably an NMOS; however, a PMOS may be used in the alternative, with corresponding changes in the pixel circuit. The gate 76 of device 75 is connected to a bus line 77 which carries a COLLECT signal to the cells 72 of a common row. Bus line 77 is preferably connected to identical devices 75 within all cells 72 of a common row $R_i$. The pixel circuit of cell 72 may include two buses $34_i$ and $33_i$ to supply the VR and VDD voltages, respectively. Alternatively, the drain of FET 23 may be connected directly to VR bus $34_i$, as depicted by dotted line 73, thereby eliminating the separate bus $33_i$ in a manner analogous to that shown in FIG. 7. In either case, FET 21 operates in the same manner as described above to reset the reference node 25 to nearly the voltage level VR on bus $34_i$ when the RESET signal is pulsed. Device 75 is used to collect the photocharge and also to transfer the photocharge from the photosensitive region to reference node 25 through FET 22. FET 23 amplifies or buffers the change in potential on reference node 25 to provide a proportional voltage level VOUT on column data line $15_j$. Accordingly, the pixel circuit of imager cell 72 likewise eliminates the large MOSFET 12 of FIG. 1 used to select the row (active pixel row) during the read cycle. Instead, the relatively small FET 22 is used to receive the ROW SELECT signal to activate or deactivate the pixel, while also performing the photocharge transfer function.

Figure 11:
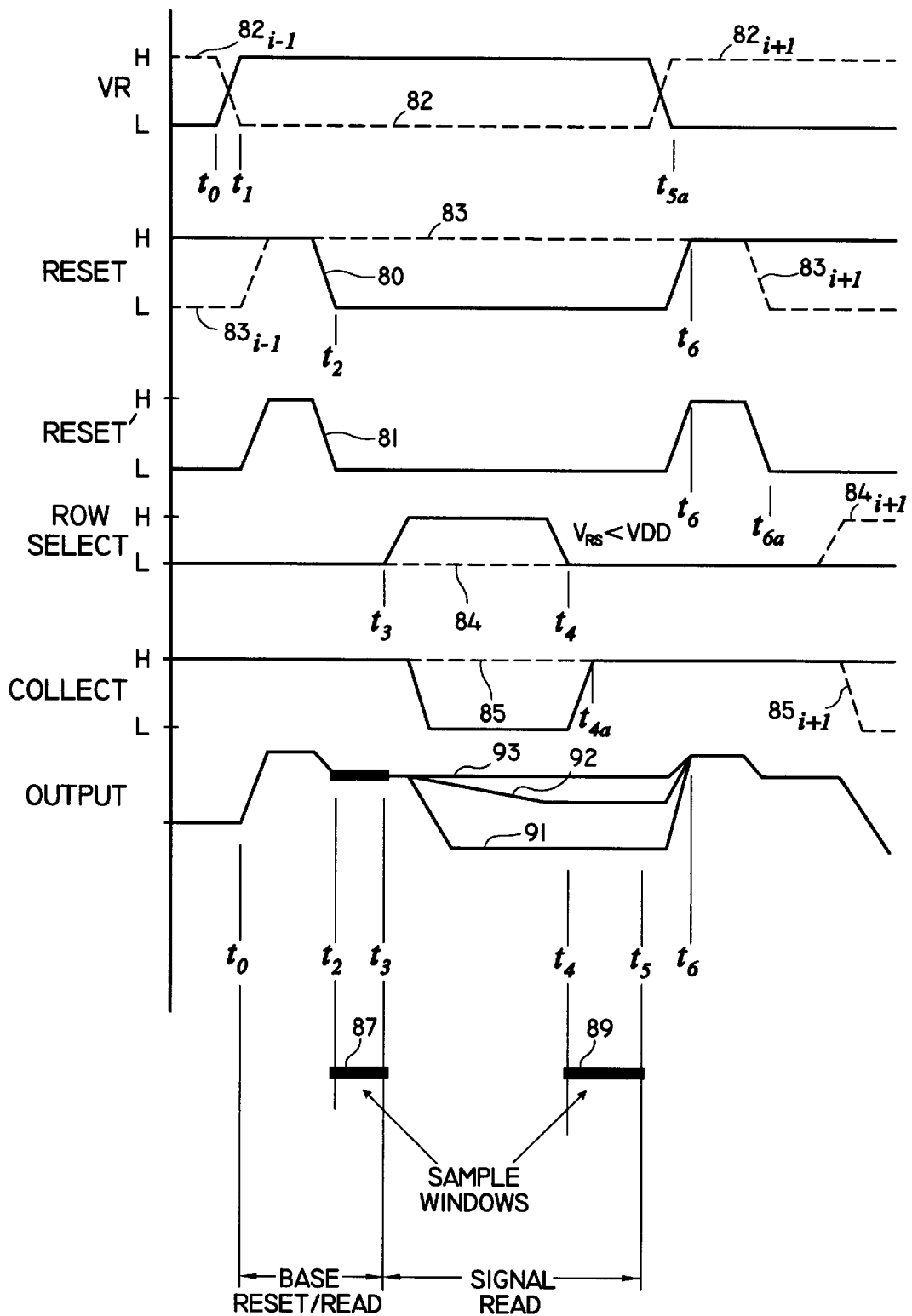
FIG. 11 is a timing diagram of waveforms applied to imager cells of FIGS. 10 and 12.

Operation of image sensor 70 will now be described in conjunction with the timing diagram of FIG. 11. The operation is similar to that discussed above for the photodiode pixel circuit of FIG. 3. In FIG. 11, the solid lines of the various waveforms represent the signals applied to the active pixel 72 (i.e., active between times $t_0$ to $t_6$) whereas the dotted lines 82–85 represent the corresponding signals applied to the inactive pixels of image sensor 70. Also, the RESET' waveform 81 in FIG. 11 may be applied on the $RES_i$ bus as an alternative to the RESET waveform 80 shown directly above.

In operation of pixel 72 with the RESET waveform 80, the time interval prior to time $t_0$ represents a photocharge collection period during which VR is low, RESET is high, ROW SELECT is low, and COLLECT is high. During this time, photocharge is collected in the potential well induced by the gate 76 of device 75, and the potential under the photogate is lowered corresponding to the amount of photocharge collected. The source follower FET 23 of this pixel is inactive (OFF) at this time because FET 21 is ON, thereby holding the reference node 25 at a low potential (low VR). (Meanwhile, VR applied to the pixel 30 in the preceding row $R_{i-1}$ is high, as indicated by trace $82_{i-1}$, to read out charge from that pixel. During the photocharge collection period for any given pixel, charge from the other pixels in the column is sequentially read out).

The base reset cycle is then started at time $t_0$ by raising VR to high at time $t_1$, thus setting reference node 25 to a high potential. RESET is then brought to low at time $t_2$, isolating reference node 25 from the VR bus. Clock feedthrough due to RESET going low and to the parasitic gate to source capacitance of FET 21, is also stored in the reference node. After RESET goes low, the potential of reference node 25 can be read out during sample window 87 at the column bus $15_j$ through source follower FET 23. This is the reset value for the subsequent correlated double sampling operation as described in the M. H. White et al. article cited above.

After the reset value is read in the sampling period 87, ROW SELECT is brought to a value intermediate the power supply voltage (VDD) and ground (or between VR and ground in the embodiment of pixel 72 where the drain of FET 23 is tied to the VR bus line $34_i$). This sets a lowered potential barrier between photogate 75 and reference node 25. The potential of photogate 75 is then lowered, thus pushing the electrons collected underneath the photogate over the lowered potential barrier set by the ROW SELECT transistor 22 and towards reference node 25. The potential of the reference node will then fall corresponding to the amount of electrons collected under the photogate 75. The column bus output voltage VOUT will fall corresponding to the reference node potential. After all the photocharge has been transferred, ROW SELECT is brought low at time $t_4$ and COLLECT is raised high again at time $t_{4a}$ (creating an empty potential well for the next photocharge collection period). Bringing the ROW SELECT low and the COLLECT high will cancel out the clock feedthrough from the signal. It is noted that as an alternative, COLLECT may be brought high prior to ROW SELECT going low.

Signal readout of voltage VOUT on the column bus is then performed at the sampling window 89. For example, voltage level 91 is measured when light intensity is high, level 93 is measured when light intensity is low (dark condition) and level 92 represents an in between condition. The reset value obtained in readout circuit 31 from the reset read period can be subtracted from the signal value obtained during this period to complete the correlated double sampling operation. Following signal readout, VR is brought low at time $t_{5a}$ to turn the source follower FET 23 OFF, isolating that pixel 72 from the column bus and beginning a new photocharge collection period. During this time, data can be read out from other pixels in the column, as indicated by waveform traces $82_{i+1}$–$85_{i+1}$.

In operation of pixel circuit 72 with the alternate RESET' waveform 81 on the $RES_i$ bus, prior to the reset period, RESET can be brought low before raising VR. (This may be done at time $t_{6a}$ of the previous read cycle). This technique allows feedthrough through the RESET transistor 21 due to its gate to source capacitance to be canceled. After the signal read period, the RESET switch is brought high again at time $t_6$ (after VR goes low at time $t_{5a}$) to hold the readout node to the low potential at VR so as to isolate the source follower FET 23 from the column bus and allow other pixel rows to put signals on the column bus. Since the potential of node 25 was just set low, FET 23 will remain OFF during this period.

The operation of pixel circuit 72 with a common reset bus $34_i$ supplying bias voltage VR to both FETs 21 and 23 is the same as the photogate pixel circuit with a separate reset bus described above. By connecting the source follower power supply to the VR bus, one signal line is eliminated from the pixel circuit, resulting in a smaller area occupied by the pixel circuits, and hence enlarging the photosensitive area.

Figure 12:
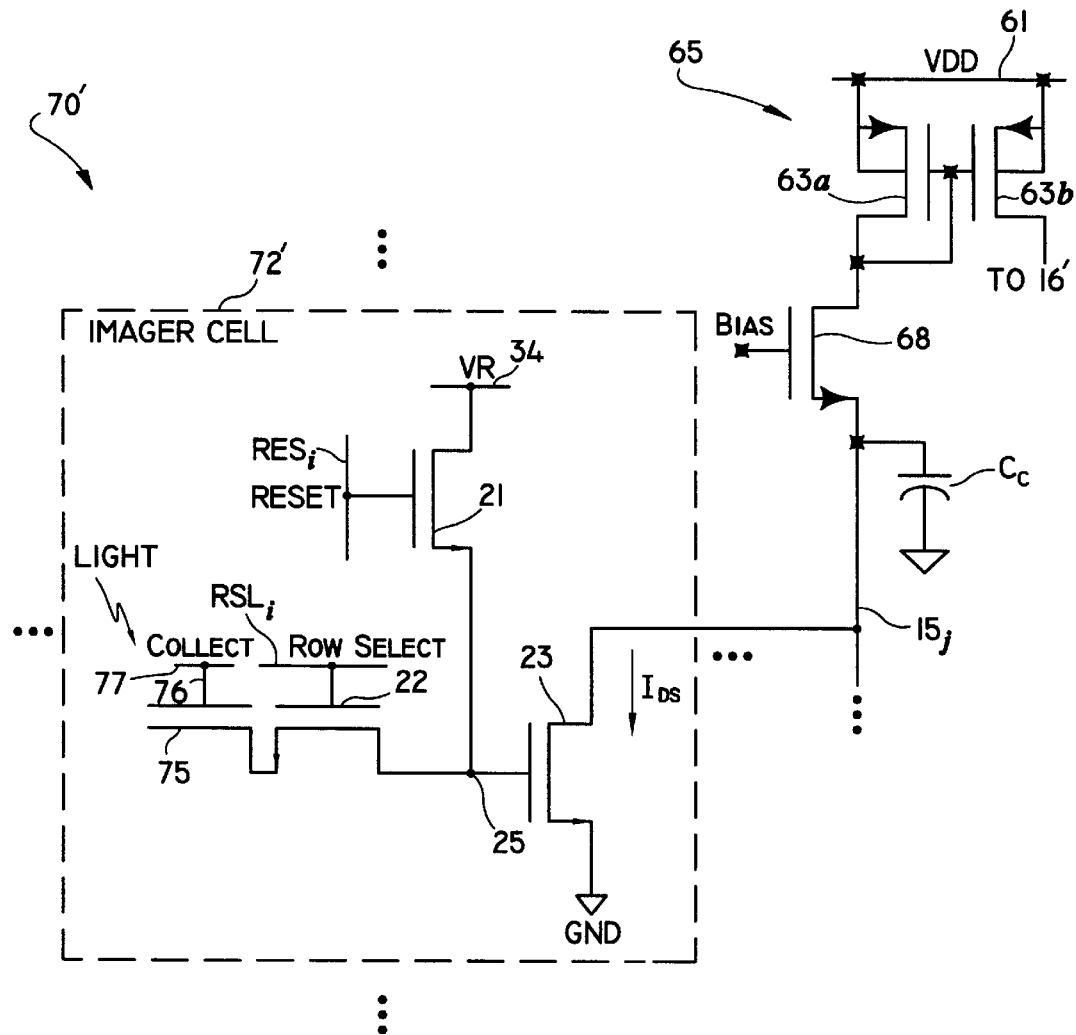
FIG. 12 is an embodiment of an image sensor with a current mode output.

Referring now to FIG. 12, another embodiment 70' of an image sensor according to the present invention is similar to image sensor 70 just discussed, except that a current mode output is provided at the column bus, rather than a voltage output. As such, imager cell 72' differs from image cell 72 by connecting the drain of FET 23 to the column bus and its source to ground. The operation and timing waveforms of the pixel circuit of image cell 72' is the same as that for image cell 72 with a separate reset bus described above. The OUTPUT waveform of FIG. 11 will correspond to a current rather than a voltage. Instead of using a readout circuit to read out the potential at the column bus corresponding to the reference node 25 potential, the reference node potential is used to control the IDS current through FET 23. The reference node potential determines the $V_{GS}$, and the IDS vs. $V_{GS}$ relationship is depicted in FIG. 9. The transfer function of light to current (IDS) is non-linear. BIAS transistor 68 sets the bias current of the column bus. The current at the column bus is read out by current mirror 65, which provides an output signal to processing/image storage electronics 16'.

Figure 13A:
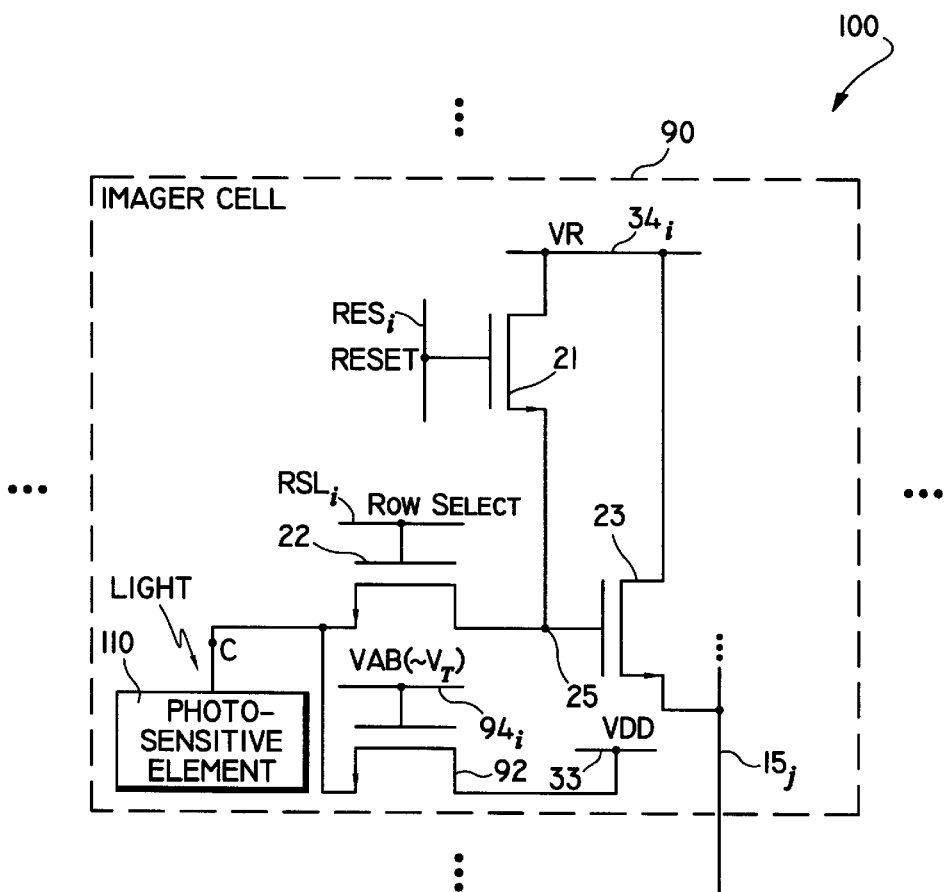
FIGS. 13A–13C and 14 schematically illustrate alternate embodiments of image sensors which include anti-blooming.
Figure 13B:
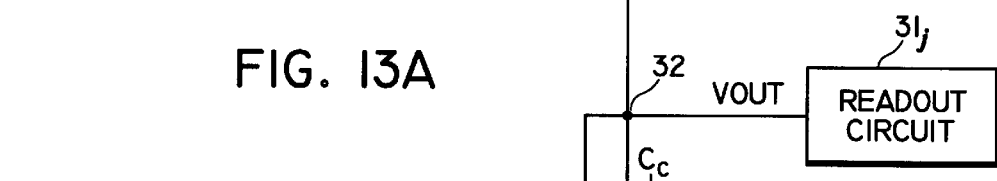
Figure 13B:
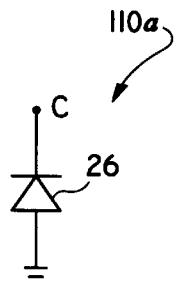
Figure 13C:
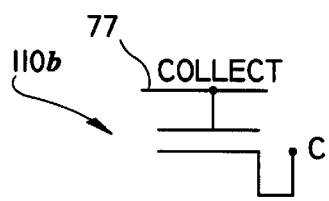

Turning now to FIG. 13A, yet another embodiment 100 of an image sensor according to the present invention is schematically illustrated. This embodiment utilizes a common supply voltage (VR) bus $34_i$ tied to the drains of FETS 21 and 23 within each row of imager cells 90. Each pixel circuit (imager cell) 90 of sensor 100 includes a photosensitive element 110, which may be either a photodiode 110$a$ as shown in FIG. 13B or a phototransistor 110$b$ (FIG. 13C) receiving a COLLECT signal on bus line 77 at its gate. In either case, an additional transistor 92 receives a voltage VAB on bus 94 (connected to the pixels of a common row) to allow excess photocharge to be bled off to avoid blooming. Otherwise, operation of this pixel circuit (with photodiode 110$a$) is the same as the photodiode pixel circuit 30' with a common VR bus shown in FIG. 7 and its associated timing diagram of FIGS. 5 or 6. When phototransistor 110$b$ is used as the photosensitive element, operation of pixel circuit 90 is essentially the same as pixel circuit 72 of FIG. 10 with the waveforms of FIG. 11. The drain of FET 92 is tied to a power supply (VDD) bus $33_i$ while its source is connected to the photodiode 110$a$ cathode or the source or drain of FET 110$b$. FET 92 is biased around the threshold voltage $V_T$ of the transistor to maximize the potential well of the photosensitive element. This embodiment requires one extra signal line $94_i$ over the embodiments without anti-blooming (FIG. 7 or 10).

Figure 14:
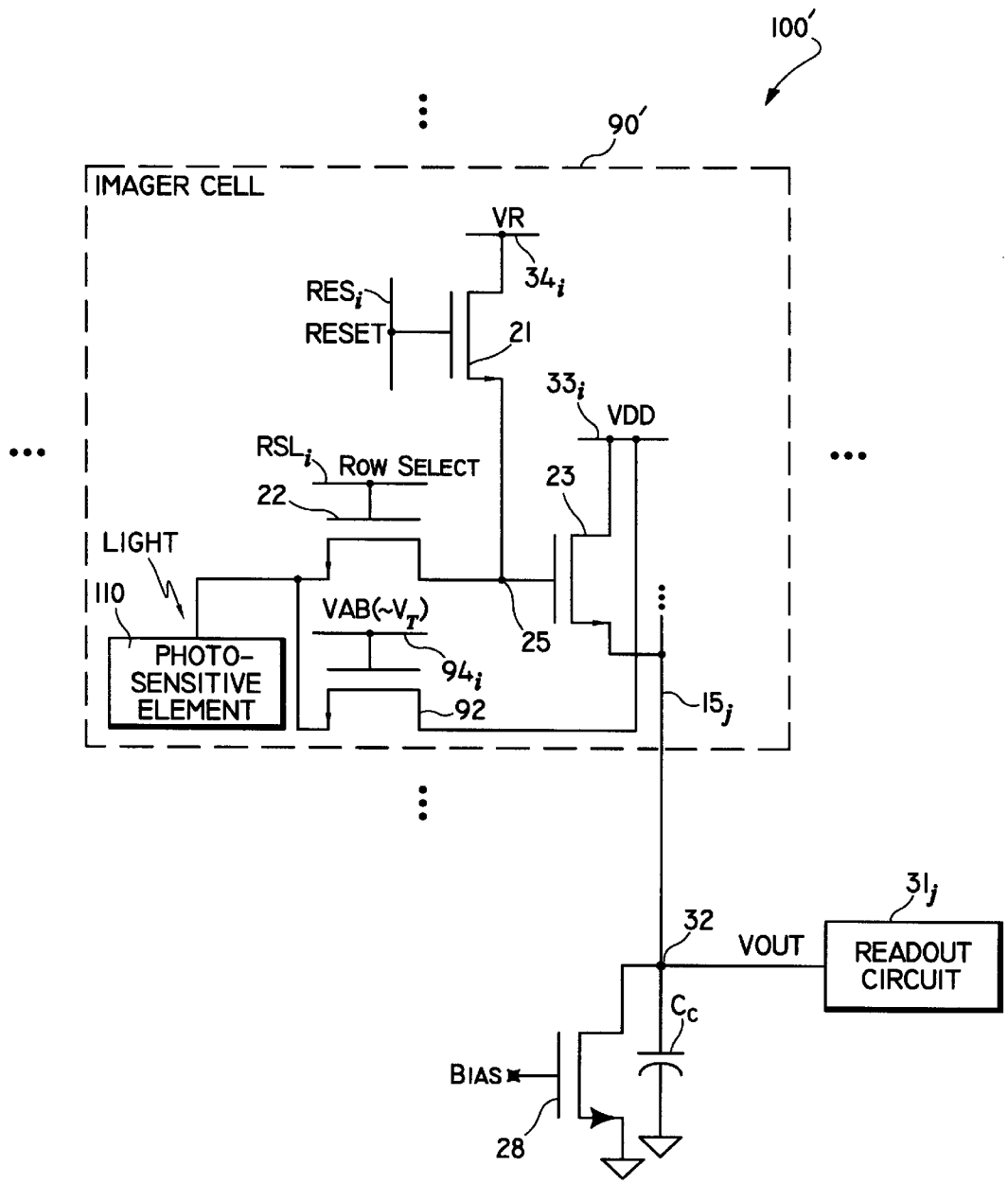

Referring to FIG. 14, image sensor 100' is another embodiment of the subject invention. This embodiment differs slightly from image sensor 100 of FIG. 13A in that the VR bus 34' is not tied to the drain of FET 23. Instead, VR bus $34_i$ is connected only to FET 21, while the VDD bus $33_i$ is connected to the drains of FETs 23 and 92. Photosensitive element 110 may be either photodiode 110$a$ or phototransistor 110$b$ of FIGS. 13B and 13C, respectively. Operation of this embodiment is the same as that of FIG. 13A. Voltage VAB is set around the threshold voltage $V_T$ of the transistor to maximize the potential well of the photosensitive element 100. One extra signal line $94_i$ is required over the embodiments without anti-blooming (FIG. 7 or 10).

Figure 15:
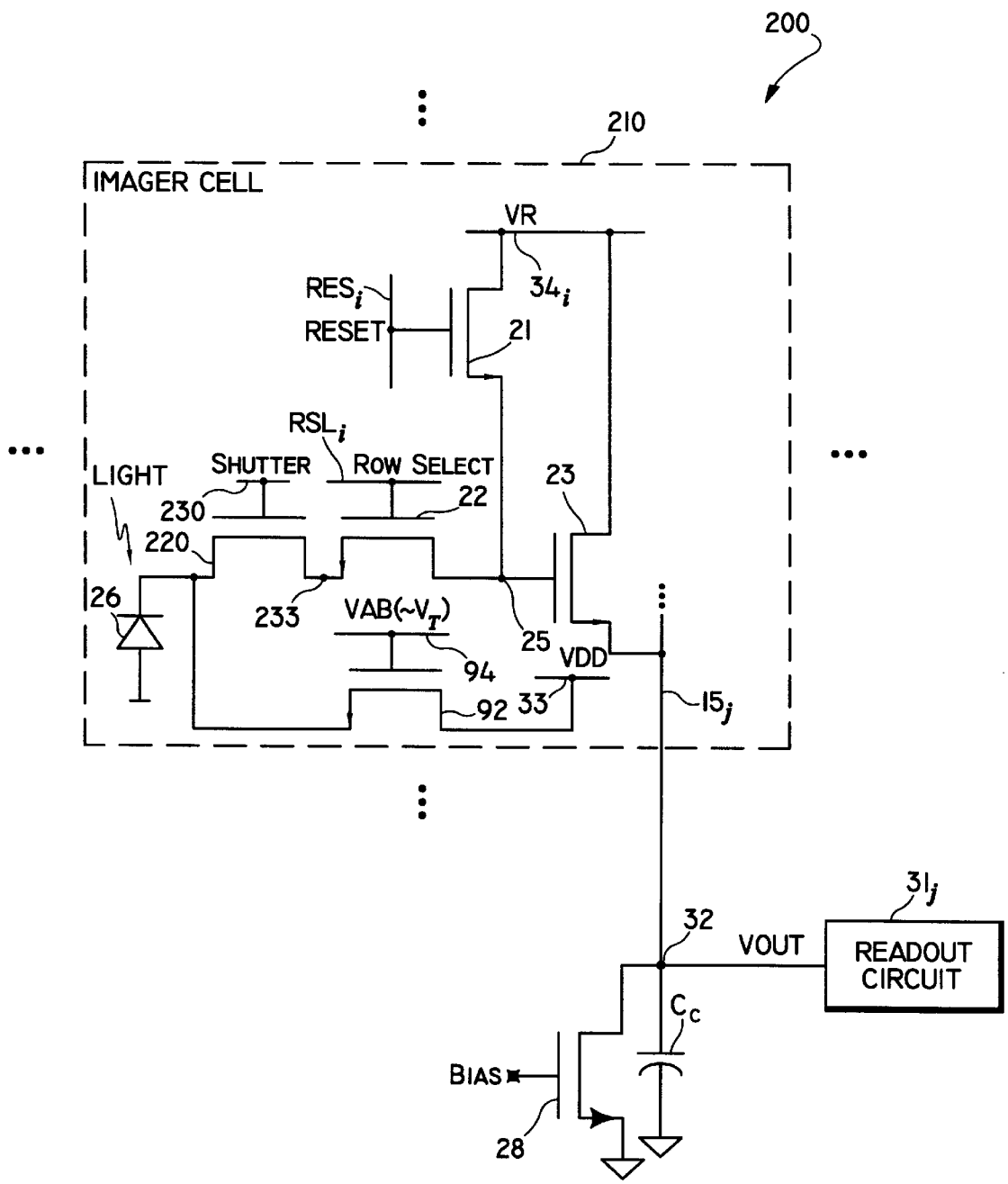
FIG. 15 shows another embodiment of an image sensor employing anti-blooming and electronic shutter transistors.

Turning now to FIG. 15, another image sensor 200 in accordance with the present invention includes a shutter transistor 220 within each imager cell 210. A SHUTTER signal is applied on a bus line 230 connecting the gates of FETs 220 within a common row. Operation of this imager is basically the same as that of image sensor 100 (with photodiode and separate VR bus) of FIG. 13A, but with an additional electronic shutter function. As an alternative to the configuration of FIG. 15, the anti-blooming transistor can be eliminated to provide more space for the photosensitive element while sacrificing the anti-blooming capability. In either case, the shutter function enables a "still" image to be taken whenever an external switch is activated, similar to a mechanical shutter in a camera. For motion picture applications, e.g., camcorders, the shutter function allows for versatility in the shutter speed whereby higher quality video is achievable for fast moving subjects.

Figure 16:
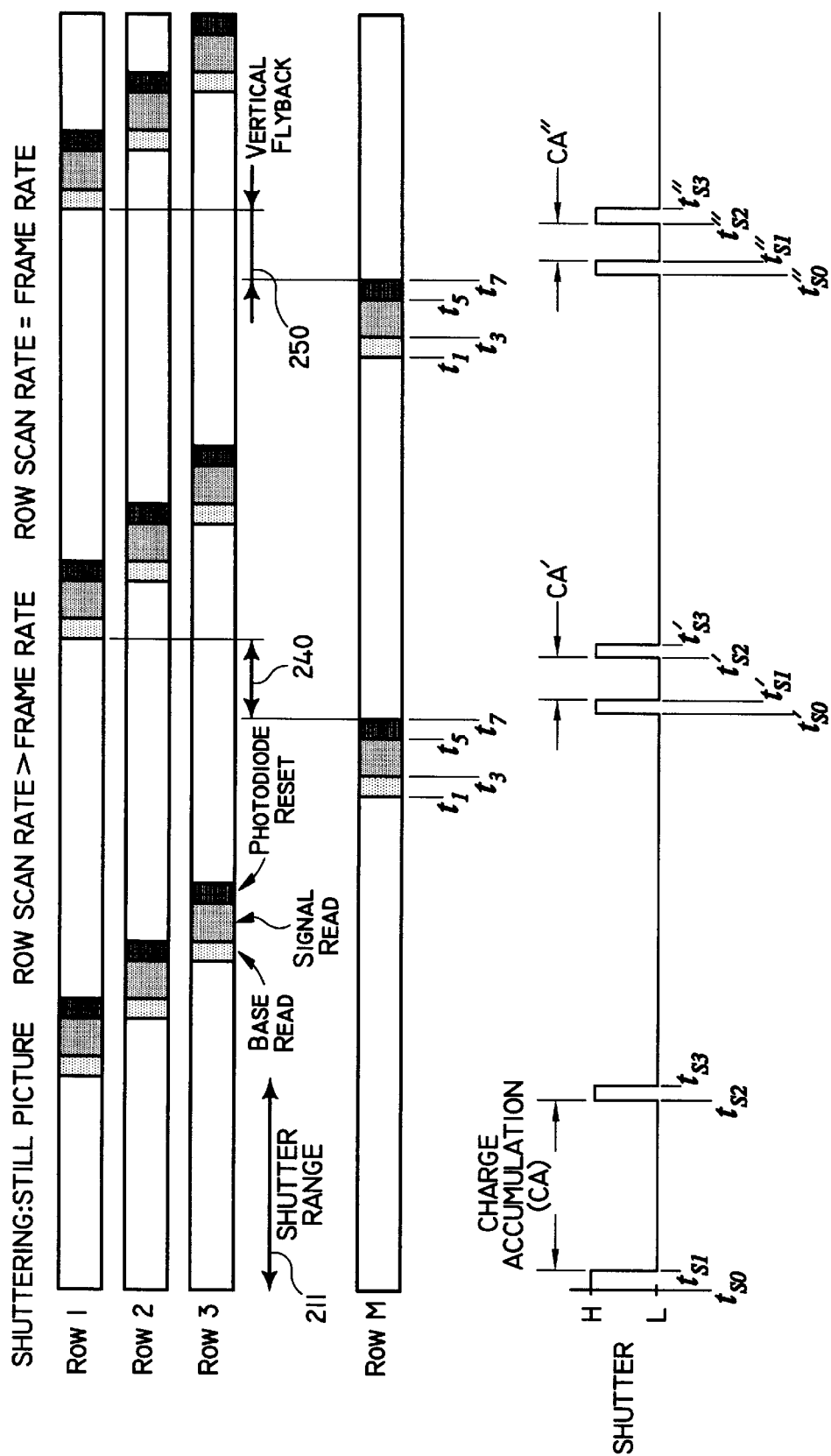
FIG. 16 is a timing diagram showing waveforms within the image sensor of FIG. 15.

Referring to the timing diagram of FIG. 16, three different scenarios are presented: still picture, motion picture with row scan rate greater than the frame rate, or about equal to the frame rate. The time intervals designated as "charge accumulation", "base read", "signal read" and "photodiode reset" correspond to the respective timing periods of FIG. 5 or 6. When an external switch is activated to initiate a still picture, the SHUTTER signal is pulsed between times $t_{S0}$–$t_{S1}$, turning the shutter transistor 230 ON in all the cells 230 of the array to reset all the photodiodes. During this interval, VR, RESET and ROW SELECT are high for all the cells in the array to reset the potential of all photodiodes. After a desired exposure time 211 has elapsed, shutter transistor 230 is turned on momentarily again between times $t_{S2}$–$t_{S3}$, whereby the photocharge from photodiode 26 is shared with a storage node 233 defined between FETS 22 and 220. The signal charge is held at the storage node until the pixel is ready to be read row by row. Hence, for still pictures, the light charge accumulation time CA can be varied by varying the time interval between the two SHUTTER pulses. As was the case in the embodiments above, photodiode 26 may be a pinned photodiode. In this case, the signal charge is completely transferred from pinned photodiode 26 to storage node 233 by turning on shutter transistor 220. During signal read, this signal charge is shared between the storage node 233 capacitance and the reference node 25 capacitance.

For motion pictures with row scan rate > frame rate, after image data is read out from all the rows, whatever time remains before the onset of the next frame (i.e., time interval 240) can be used to accumulate light charge. The amount of time for this light charge accumulation is variable. A first SHUTTER pulse is applied between times $t_{S0}'$ to $t_{S1}'$ to reset all the photodiodes in the array, where $t_{S0}'$ coincides with or follows time $t_7$. A charge accumulation interval CA' follows, after which the photocharge collected is transferred to the storage node 233 by application of SHUTTER between times $t_{S2}'$ to $t_{S3}'$. The image data is then read out row by row. Hence, the charge accumulation time can be varied by varying the row scan rate, to thereby tailor picture quality for different moving subject speeds.

When the row scan rate is about equal to the frame rate, then the only time available for charge accumulation is during the vertical flyback interval 250 and is not variable. A first SHUTTER pulse is applied between time $t_{S0}''$ to $t_{S1}''$ to reset the photodiodes. After charge accumulation intense CA'', SHUTTER is applied again between times $t_{S2}''$ to $t_{S3}''$, whereupon image data is read out row by row.

While the above description contains many specifics, these specifics should not be construed as limitations on the scope of the invention, but merely as exemplifications of preferred embodiments thereof. For instance, while the embodiments have been described with particular reference to NMOSFETS within the pixel cells, it is possible to employ PMOSFETS. In addition, it may be possible to utilize bipolar devices within the pixels as alternatives to PETs. Those skilled in the art will envision many other possible variations that are within the scope and spirit of the invention as defined by the claims appended hereto.

What is claimed is:

1. An image sensing device having a plurality of imager cells, each of said imager cells comprising:
   a photosensitive element providing a photocharge responsive to incoming light;
   a first transistor coupled to an activation line carrying an activation signal to a first plurality of imager cells of said device to selectively activate cells for image data readout, said first transistor operable to transfer said photocharge towards a reference circuit node within said imager cell responsive to said activation signal;
   a second transistor operably coupled to said first transistor, said second transistor operative to selectively set a voltage level at said reference node; and
   a third transistor having a control terminal coupled to said reference node, and an output terminal coupled to an output data line common to a second plurality of imager cells, said third transistor providing an output signal on said data line related to said reference node voltage and indicative of an amount of light incident upon said photosensitive element.

2. The device of claim 1 wherein said photosensitive element comprises a photodiode.

3. The device of claim 2 wherein said photodiode comprises a pinned photodiode.

4. The device of claim 1 wherein said photosensitive element comprises a photogate.

5. The device of claim 1 wherein said first, second and third transistors are MOSFETs.

6. The device of claim 1 wherein said first plurality of imager cells comprise a row of imager cells and said activation line comprises a row select line carrying a row select signal, said second plurality of imager cells comprises a column of imager cells, and said output data line is a column data line.

7. The device of claim 1 wherein during a signal read operation from an active cell, said third transistor of inactive cells is caused to turn off, whereby said reference nodes of inactive cells are isolated from said output data line.

8. The device of claim 1 wherein noise of image data is reduced using correlation double sampling, by said third transistor providing a first output signal indicative of a reset level during a first sampling interval of a readout interval and a second output signal indicative of light intensity during a second sampling interval of said readout interval, said first and second outputs being compared, whereby image data noise is reduced.

9. The device of claim 1 wherein said output signal is a voltage.

10. The device of claim 1 wherein said output signal comprises a current output.

11. The device of claim 1, further comprising a shutter transistor coupled between said photosensitive element and said first transistor, said shutter transistor performing an electronic shuttering function.

12. The device of claim 1, further comprising an anti-blooming transistor coupled to said photosensitive element.

13. The device of claim 12, further comprising a shutter transistor coupled between said photosensitive element and said first transistor, said shutter transistor performing an electronic shuttering function.

14. The device of claim 12 wherein a conducting terminal of said third transistor and said anti-blooming transistor are connected to a common voltage supply line.

15. The device of claim 12 wherein conducting terminals of said anti-blooming transistor and said third transistor are connected to different voltage supply lines.

16. The device of claim 1 wherein conducting terminals of said second and third transistors are connected to a common voltage supply line that supplies voltage to said first plurality of imager cells.

17. The device of claim 1 wherein conducting terminals of said second and third transistors are connected to different voltage supply lines.

18. The device of claim 1, including CMOS timing and logic circuitry supplying voltage waveforms to said imager cells to control image data readout.

19. An image sensor having a plurality of imager cells arranged in rows and columns, each of said imager cells comprising:
   a photosensitive element providing a photocharge responsive to incoming light;

a first transistor having a control terminal coupled to a row select line carrying a row select signal to imager cells of a common row to selectively activate imager cells for image data readout, said first transistor operable to transfer said photocharge towards a reference circuit node within said imager cell responsive to said row select signal;

a second transistor operably coupled to said first transistor, said second transistor operative to selectively set a voltage level at said reference node responsive to a reset signal applied to a control terminal thereof, said reset signal being applied to imager cells of a common row; and a third transistor having a control terminal coupled to said reference node, and an output terminal coupled to a column data line, said third transistor providing, on said column data line during an image data readout interval for the imager cells of said common row, a first output signal indicative of a reset level at said reference node in a first sampling interval of the readout interval, and a second output signal related to said reference node voltage and indicative of an amount of light incident upon said photosensitive element during a second sampling interval within said readout interval, wherein a comparison is performed between said first and second output signals to extract image data with noise removed.

20. The image sensor of claim 19 wherein during said second sampling interval, said row select signal is high whereby said first transistor is turned on.

21. The image sensor of claim 19 wherein immediately prior to said second sampling interval, said row select signal is high and said first transistor is on, and during said second sampling interval, said row select signal is low and said first transistor is off, whereby clock feedthrough through said first transistor is reduced.

22. The image sensor of claim 19 wherein during said readout interval and prior to said first sampling interval, said reset signal is high and a reset voltage VR applied to a conducting terminal of said second transistor is high, and during said first sampling interval, said reset signal is low and said second transistor is off.

23. The image sensor of claim 20 wherein during a time interval just prior to a base reset/read interval, said reset signal is brought low, said reset level being high during a first portion of said base reset/read interval, and low during a second portion of said base reset/read interval, said second sampling interval occurring during said second portion of said base reset/read interval, whereby clock feedthrough through said second transistor is reduced.

24. The image sensor of claim 19 wherein during a time prior to said readout interval, photocharge collection takes place wherein said reset signal is high, said row select signal is low and a voltage VR applied to a conducting terminal of said second transistor is low, thereby holding said reference circuit node at a low potential and turning said third transistor off.

25. An image sensor having an array of imager cells arranged in rows and columns, with CMOS timing and logic circuitry applying control signals to said array, each of said imager cells comprising:

a photosensitive element providing a photocharge responsive to incoming light;

a first field effect transistor (FET) having a gate terminal coupled to a row select line carrying a row select signal to imager cells of a common row to selectively activate imager cells for image data readout, and a conducting terminal coupled to a reference circuit node, said first FET operable to transfer said photocharge towards said reference circuit node within said imager cell responsive to said row select signal;

a second FET operably coupled to said first FET, said second FET operative to selectively set a voltage level at said reference node responsive to a reset signal applied to a gate terminal thereof, said reset signal being applied to imager cells of a common row, said second FET having a first conducting terminal coupled to said reference circuit node and a second conducting terminal coupled to a control line common to said common row and carrying a signal VR; and a third FET having a gate coupled to said reference node, and an output terminal coupled to a column data line, said third transistor providing, on said column date line, during an image data readout interval for the imager cells of said common row, a first output signal indicative of a reset level at said reference node in a first sampling interval of the readout interval, and a second output signal related to said reference node voltage and indicative of an amount of light incident upon said photosensitive element during a second sampling interval within said readout interval, wherein a comparison is performed between said first and second output signals to extract image data with noise removed.

26. The image sensor of claim 25, wherein during said readout interval, the VR signal applied to imager cells of inactive rows is low, the reset signal applied to imager cells of inactive cells is high, and the row select signal applied to inactive rows is low.

* * * * *